Figures 1, 2:
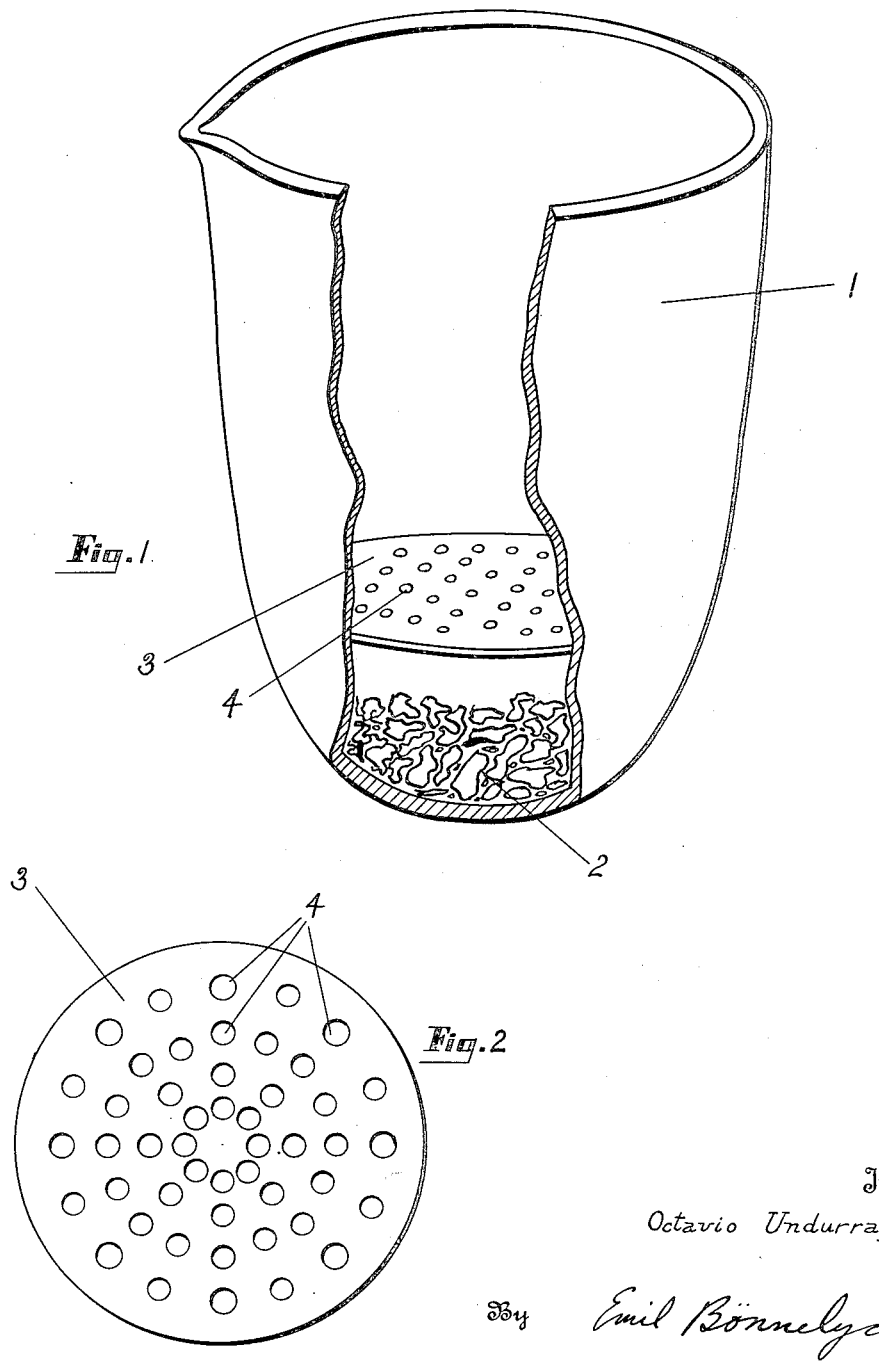

Jan. 13, 1925. 1,522,605

O. UNDURRAGA

MANUFACTURE OF STEEL AND LOW CARBON IRON

Filed May 25, 1923

Inventor
Octavio Undurraga

By Emil Bönnelycke
Attorney

Patented Jan. 13, 1925.

1,522,605

UNITED STATES PATENT OFFICE.

OCTAVIO UNDURRAGA, OF SANTIAGO, CHILE.

MANUFACTURE OF STEEL AND LOW-CARBON IRON.

Application filed May 25, 1923. Serial No. 641,476.

*To all whom it may concern:*

Be it known that I, OCTAVIO UNDURRAGA, citizen of the Republic of Chile, residing at Santiago, Chile, have invented certain new and useful Improvements in the Manufacture of Steel and Low-Carbon Iron, of which the following is a specification.

This invention relates to the manufacture of steel and iron of low carbon content and is designed to replace the Bessemer process in accordance with which an air blast is used to oxidize carbon contained in iron. The purpose of the present invention is to provide an efficient process which can be carried out in a less expensive manner than the Bessemer or other processes whereby the carbon content of iron is reduced.

My invention resides in a process of reducing the carbon content of iron or steel of the kind in which a compound is caused to liberate oxygen to react with the carbon, said process consisting in mixing a quantity of calcium carbonate with a substantially greater quantity of nitrate of soda and pouring the molten metal onto the mixture, whereby oxygen is released which oxidizes carbon contained in the molten metal. According to a preferred procedure, the compound or mixture is placed in the bottom of a crucible, and is covered by a fusible member such as a perforated iron plate, the molten iron being poured onto the plate which melts and mixes with the molten metal. This metallic mixture absorbs the alkaline compound or mixture to the degree of saturation, the released oxygen combining with the carbon, whereby steel or iron of low carbon content is produced. The top of the contents of the crucible may be skimmed with a ladle to remove impurities and the metal may then be poured into molds to obtain ingots, or desired cast articles. The plate is preferably about one twenty-fourth of an inch thick and the perforations about one inch in diameter. This plate may rest directly on subjacent material, or may be supported by the walls of the crucible some distance above the material. While the crucible may be of any desired shape, one with cylindrical, downwardly converging walls is preferable because of the greater ease of fitting and placing the plate therein. By having a freely open top, the gases generated in the crucible may esape.

One way of proceeding in accordance with this invention is to place in the bottom of the crucible from 20 to 25 kgs. of nitrate of soda and about 2 kgs. of calcium carbonate, and mixing these materials. The plate is then placed in the crucible over the materials, and about 100 kgs. of molten, smelted iron are poured onto the plate.

In accordance with this invention, scrap iron may be converted into a better, harder iron by using a smaller proportion of nitrate of soda and calcium carbonate. By varying the proportions of these compounds to each other and/or the proportion of the mixture to the metal, various grades and kinds of steel may be produced.

When the thin perforated iron plate that goes on top of the mixture of alkaline earths is melted, it mixes with the molten iron poured into the crucible, the common mass being changed into a homogeneous compound; and the oxide of sodium passing through the melted iron oxidizes a further portion of carbon. As a result of this oxidation the molten metal loses carbon until it contains only a very small proportion of this element, thus becoming a steel of high grade.

In the accompanying drawing, which is illustrative of apparatus that may be used for carrying out this invention, Figure 1 is a perspective view of a crucible, with a part broken away to show the interior, and Fig. 2 is a plan view of the fusible member or iron plate.

The crucible 1 contains in the bottom part thereof, the alkaline earth mixture 2, and over this mixture is the iron plate 3, formed with perforations 4. This plate is shown as fitting against the walls and it is clear that a plate of less diameter would rest farther down in the crucible while a plate of larger diameter would rest at a higher level.

I claim as my invention:

1. A process of manufacturing steel or iron of low carbon content which consists in mixing a quantity of from 20 to 25 parts by weight of calcium carbonate with a quantity of about 2 parts by weight of nitrate of soda, covering said mixture with a metal plate and pouring molten iron onto the plate to melt the same and to release oxygen from the mixture, whereby carbon contained in the molten metal is oxidized with the released oxygen.

2. A process of reducing the carbon content of iron, which consists in placing in a crucible a mixture of a quantity of calcium carbonate and a substantially greater quantity of nitrate of soda; covering said mixture with a thin perforated iron plate, and pouring molten iron into the crucible upon the plate, whereby the mixture is decomposed and the carbon of the iron oxidized by the oxygen released.

3. In the manufacture of steel or iron of low carbon content, the step of pouring molten iron onto a mixture of a quantity of calcium carbonate and a substantially greater quantity of nitrate of soda.

4. A process according to claim 3 in which the mixture consists of from 20 to 25 parts by weight of nitrate of soda and approximately 2 parts by weight of calcium carbonate.

In testimony whereof I affix my signature.

OCTAVIO UNDURRAGA.